(12) United States Patent
Breuninger et al.

(10) Patent No.: US 11,126,016 B2
(45) Date of Patent: Sep. 21, 2021

(54) METHOD AND DEVICE FOR DETERMINING PARAMETERS FOR SPECTACLE FITTING

(71) Applicants: Carl Zeiss Vision International GmbH, Aalen (DE); Carl Zeiss AG, Oberkochen (DE)

(72) Inventors: Tobias Breuninger, Herbrechtingen (DE); Holger Wegendt, Mögglingen (DE); Oliver Schwarz, Ellwangen (DE); Jeremias Gromotka, Aalen (DE)

(73) Assignees: Carl Zeiss Vision International GmbH, Aalen (DE); Carl Zeiss AG, Oberkochen (DE)

( * ) Notice: Subject to any disclaimer, the term of this patent is extended or adjusted under 35 U.S.C. 154(b) by 379 days.

(21) Appl. No.: 16/151,068

(22) Filed: Oct. 3, 2018

(65) Prior Publication Data

US 2019/0033624 A1    Jan. 31, 2019

Related U.S. Application Data

(63) Continuation of application No. PCT/EP2017/057880, filed on Apr. 3, 2017.

(30) Foreign Application Priority Data

Apr. 4, 2016  (DE) ...................... 10 2016 106 121.2

(51) Int. Cl.
   G02C 13/00    (2006.01)
(52) U.S. Cl.
   CPC .................................. G02C 13/005 (2013.01)
(58) Field of Classification Search
   CPC ............................ G02C 13/003; G02C 13/005
   USPC ........................................................ 351/178
   See application file for complete search history.

(56) References Cited

U.S. PATENT DOCUMENTS

| 5,818,954 | A |   | 10/1998 | Tomono et al. |
| 6,095,650 | A | * | 8/2000 | Gao ..................... G02C 13/005 |
|  |  |  |  | 351/227 |
| 6,659,609 | B2 |  | 12/2003 | Mothes |
| 6,692,127 | B2 | * | 2/2004 | Abitbol ............... G02C 13/005 |
|  |  |  |  | 351/227 |

(Continued)

FOREIGN PATENT DOCUMENTS

| CN | 101801259 A | 8/2010 |
| CN | 103971405 A | 8/2014 |

(Continued)

OTHER PUBLICATIONS

English-language translation of the International Preliminary Report on Patentability issued in PCT/EP2017/057880, to which this application claims priority, completed Jun. 19, 2018.

(Continued)

*Primary Examiner* — Nicholas R. Pasko
(74) *Attorney, Agent, or Firm* — Thrive IP®; Georg Hasselmann

(57) ABSTRACT

A depth information detection device detects an item of depth information relating to a user's head, including a distance from the user's head to the device. On the basis of this depth information and, if applicable, additional information such as images, an evaluation device determines the desired parameters for fitting the spectacles, such as centering parameters.

17 Claims, 6 Drawing Sheets

(56) References Cited

U.S. PATENT DOCUMENTS

| | | |
|---|---|---|
| 7,740,355 B2 | 6/2010 | Sessner et al. |
| 2010/0026955 A1 | 2/2010 | Fisher et al. |
| 2010/0220285 A1 | 9/2010 | Simmonds |
| 2010/0239135 A1 | 9/2010 | Luisi et al. |
| 2011/0043610 A1 | 2/2011 | Ren et al. |
| 2014/0307058 A1 | 10/2014 | Kirk et al. |
| 2015/0055085 A1 | 2/2015 | Fonte et al. |
| 2015/0323310 A1 | 11/2015 | Coon et al. |
| 2015/0347833 A1 | 12/2015 | Robinson et al. |
| 2016/0005228 A1 | 1/2016 | Niebla, Jr. et al. |
| 2016/0011437 A1* | 1/2016 | Nishimura ........... G02C 13/005 351/204 |
| 2016/0041264 A1 | 2/2016 | Dielacher et al. |
| 2017/0090220 A1* | 3/2017 | Bonnin .................. A61B 3/113 |
| 2018/0042477 A1 | 2/2018 | Seitz et al. |

FOREIGN PATENT DOCUMENTS

| | | |
|---|---|---|
| CN | 104574504 A | 4/2015 |
| CN | 104808797 A | 7/2015 |
| CN | 105229411 A | 1/2016 |
| CN | 105372667 A | 3/2016 |
| CN | 105637512 A | 6/2016 |
| DE | 68928825 T2 | 4/1999 |
| DE | 102009004383 A1 | 7/2009 |
| DE | 102012007831 A1 | 10/2013 |
| DE | 102014108353 A1 | 12/2014 |
| DE | 102015001874 A1 | 8/2016 |
| EP | 1844363 B2 | 12/2015 |
| WO | 0184222 A1 | 11/2001 |
| WO | WO-2014133166 A1 * | 9/2014 ........... A61B 3/0091 |
| WO | WO-2014198623 A1 * | 12/2014 ............... G01C 3/32 |

OTHER PUBLICATIONS

Shapiro et al. "Rapid Avatar Capture and Simulation using Commodity Depth Sensors"; in Computer Animation and Virtual Worlds 2014, Proceedings of the 27th Conference on Computer Animation and Social Agents, May 2014—CASA 2014.

Office action by the Chinese Patent Office (SIPO) issued in Chinese patent application CN201780022324.7, which is a counterpart hereof, dated Aug. 27, 2019.

Newcombe et al. "DynamicFusion: Reconstruction and tracking of non-rigid scenes in real-time," The IEEE Conference on Computer Vision and Pattern Recognition (CVPR), pp. 343 to 352, 2015.

"Ophthalmic optics—Spectacle lenses—Vocabulary" (ISO 13666:2012); German and English version EN ISO 13666:2012, Oct. 2013.

International Search Report and English-language translation thereof issued in PCT/EP2017/057880, to which this application claims priority, dated Jun. 8, 2017.

International Preliminary Report on Patentability issued in PCT/EP2017/057880, to which this application claims priority, completed Jun. 19, 2018.

* cited by examiner

METHOD AND DEVICE FOR DETERMINING PARAMETERS FOR SPECTACLE FITTING

CROSS REFERENCE TO RELATED APPLICATIONS

This application is a continuation application of international application PCT/EP2017/057880, filed Apr. 3, 2017, and designating the United States, which claims priority to German patent application DE 10 2016 106 121.2, filed on Apr. 4, 2016, both of which are hereby incorporated by reference in their entireties.

TECHNICAL FIELD

The present application relates to methods and devices for determining parameters for fitting spectacles to a person's head, in particular the determination of centration parameters. Centration parameters of this type are used to correctly arrange, that is to say center, spectacle lenses in a spectacle frame, such that the spectacle lenses are worn in a correct position relative to the person's eyes.

BACKGROUND

A device of the generic type and a method of the generic type are known from U.S. Pat. No. 7,740,355 B2, for example.

The procedure used in the document involves using a pair of image recording units to generate stereo image data of a person's head or parts of the head. A three-dimensional model of the head is then calculated from the stereo image data. Desired optical parameters can be determined on the basis of the three-dimensional model. A corresponding method is likewise described. Instead of the pair of image recording units, a pattern projection can also be used in a variant described as an alternative in the document.

In the case of the device in U.S. Pat. No. 7,740,355 B2, the person to be examined is positioned in front of the device, and the image recording units then record corresponding images of the head or parts thereof. In this case, inaccuracies may occur in relation to the positioning of the person, that is to say that the person may be positioned in a manner deviating from a desired setpoint position, in particular a desired setpoint distance. This may make it more difficult to determine accurate dimensions from the images recorded by the image recording units, which are required for the determination of the parameters. Moreover, the procedure in U.S. Pat. No. 7,740,355 B2 necessitates finding corresponding points or image regions in image pairs recorded by the pair of image recording units. Depending on lighting conditions it may be difficult to implement this for a sufficient number of image points.

US 2015/323310 A1 discloses methods and devices in which a pupillary distance and a scale are determined by using a distance measurement. The document does not deal with determining parameters for spectacle fitting.

US 2018/0042477 A1, published subsequently, discloses a method and a corresponding device for determining parameters for spectacle fitting in which a measuring unit is used to detect items of depth information in relation to a user's head, wherein the measuring unit determines the distance between at least one eye and an image recording unit of the measuring unit. A parameter of the use position of spectacles or of a spectacle frame is then determined taking account of the distance determined.

US 2010/0220285 A1 discloses a method for determining parameters for spectacle fitting, in particular a pupillary distance, in which a distance between a device used and a patient is measured and the pupillary distance is measured on the basis of the distance by means of scaling.

U.S. Pat. No. 5,818,954 discloses specularly reflecting an illumination onto an optical axis of a camera.

A light field camera is disclosed in DE 10 2014 108 353 A1.

SUMMARY

It is therefore an object of the present disclosure to provide methods and devices in which an accuracy of the determination of parameters for spectacle fitting, in particular in the case of inaccurate positioning of a person to be examined as mentioned above, is improved.

Methods and devices for the determination of parameters for spectacle fitting are provided for this purpose.

In accordance with a first and second aspect, a method for determining parameters for spectacle fitting is provided, which comprises: detecting depth information in relation to a user's head, the depth information comprising a distance between the user's head and a device used for the detecting, and determining parameters for spectacle fitting on the basis of the depth information.

The depth information can also comprise a plurality of distances between the head and the device at different locations of the head, which are detected at the same time or at different times.

Moreover, in the case of the first aspect, a 2D image (also referred to hereinafter simply as image) of the head is recorded, wherein recording the 2D image and detecting the depth information are carried out via a common optical axis.

In the context of the present application, spectacle fitting is understood generally to mean fitting spectacles to a specific person, in particular to the person's head. Such spectacle fitting can begin for example with the selection of a specific type of spectacle frame, in particular a specific spectacle frame product. An expert such as an optician generally checks whether the spectacle frame fits the person's anatomy (e.g., in relation to size of the frame, width of the nosepiece, earpiece length). The frame fit is then checked (e.g., adaptation of nose pads, adaptation of the earpieces to the geometry of the face). Finally, various parameters are measured, e.g., pupillary distance, corneal vertex distance, forward inclination of the frame, frame disk angle, fitting height. This measurement of the various parameters mentioned above is referred to as centration measurement or spectacle lens centration. Some of the measured parameters influence the spectacle lens power, e.g., the corneal vertex distance. Other parameters determine how the spectacle lenses must be positioned in the frame or how they must be incorporated into the frame, e.g., the distance between the centers of the pupils when "looking to infinity" (pupillary distance) or the fitting height. Still other parameters can be used to calculate and manufacture spectacle lenses in a manner particularly well compatible and individual to the person, e.g., the forward inclination of the frame and the frame disk angle.

In the context of the present disclosure, parameters for spectacle fitting should generally be understood to mean indications which are required or usable for the spectacle fitting described above. These include, for example, dimensions relating to the person's head, in particular relating to the eye portion, a type of spectacle frame and dimensions of the spectacle frame and also the spectacle frame fit on the face.

The parameters for spectacle fitting may be, in particular, centration parameters which can be used for the spectacle lens centration explained above and which describe e.g., anatomical features of the user (e.g., distance between the pupils of the eyes) and a position of spectacles on the head. Examples of such centration parameters are described in DIN ISO 13666, edition of 2013-10, namely for example monocular pupillary distance or pupillary distance. In this case, the monocular pupillary distance is the distance between the center point of the pupil and the center line of the person's nose or the bridge of the spectacle frame for the case where the eye is in the primary position. The primary position corresponds to the position of the eyes with straight head and body posture and gaze directed straight ahead. The parameters for spectacle fitting can also comprise dimensions of a spectacle frame. The parameters for spectacle fitting can be determined on the basis of a real spectacle frame worn by the person, or else on the basis of a virtual spectacle frame that is fitted to a model of a head that is created on the basis of the depth information. In this case of using a virtual spectacle frame, the parameters for spectacle fitting can also comprise a type of a selected spectacle frame or parameters describing the selected spectacle frame, e.g., dimensions thereof.

By determining a distance between the depth information detection unit and the head of the person to be examined, it is possible to compensate for inaccurate positionings of the person to be examined, i.e., positionings that deviate from a desired setpoint position, during the determination of the parameters for spectacle fitting.

The method can further comprise determining a current head position (actual head position), in particular on the basis of the depth information, e.g., compared with a setpoint head position. In this case, the head position can comprise the position of the head in space and also the orientation thereof (e.g., inclination, viewing direction). In this case, the head position can comprise for example a lateral head rotation (i.e., about the person's body axis), a head position in an axial direction (relative to the measuring device), a lateral head inclination (i.e., in the direction of a shoulder) or a head inclination along the body axis (i.e., toward the front or toward the back), wherein the head position can be determined relative to the device according to the disclosure, e.g., to the depth information detection unit. Head positions relative to the device according to the disclosure are relevant for example for the correct arrangement of the person in front of the device according to the disclosure (e.g., within the measurement volume). The head inclination (along the body axis) has a great influence on the measurement of the fitting height. Taking it into consideration is therefore relevant to spectacle lens centration and can be used, if appropriate, for the subsequent correction of the fitting height. Determining the parameters for spectacle fitting is carried out on the basis of the determined actual head position. In this way, it is possible to take into account e.g., deviations from the setpoint head position and/or head position (e.g., in an axial direction) relative to a device used during the determination of the parameters for spectacle fitting. In this case, as already described above, the actual head position can comprise a lateral inclination of the head or an inclination of the head toward the front or back. This is particularly relevant if the intention is to take account of the natural, habitual head posture of the person at the time of determining the parameters for spectacle fitting, since the inclination of the head can influence the determination of some parameters for spectacle fitting, e.g., the determination of a frame forward inclination or the determination of a fitting height. For this purpose, the person may be requested to adopt the natural head posture, which is then detected as the actual head position. This detected actual head position is then used for determining the parameters for spectacle fitting. In this regard, the parameters for spectacle fitting can be determined appropriately for the natural head position.

By way of example, for this purpose, from the depth information it is possible to create at least one coarse 3D model of the head, from which the user's head posture and head position can be seen. As a result, the user can be given feedback in relation to the positioning of the head; by way of example, the user can be instructed to position the head differently for a measurement, for example if relevant parts of the head cannot be detected. Moreover, it is also possible to ascertain if the head posture differs from a previously ascertained habitual head posture of the user or if a zero viewing direction or main viewing direction that is desired for a measurement is not present. Consequently, the user's head can be positioned as optimally as possible in the measurement region of the device.

Determining the parameters for spectacle fitting can then be carried out on the basis of the recorded image of the head. During the recording of the image, the person can wear a spectacle frame without spectacle lenses or with support disks (simple plastic disks with no optical power), or spectacles with spectacle lenses (lenses having optical corrective power), or else no spectacle frame. Support disks of this type are for example sometimes incorporated in new spectacle frames at an optician's store. In the last case, the method can then measure the three-dimensional topography of the face and determine anatomical parameters (e.g., the distance between the pupils) as the parameters which can then be used for spectacle fitting. By using the three-dimensional topography, parameters of this type can be determined in particular independently of the head position.

The recording of the image makes it possible to use further items of information in addition to the depth information for determining the parameters for spectacle fitting, for example dimensions of the person's head that are taken from the image.

In this case, the method can comprise scaling the recorded image on the basis of the depth information and/or scaling parameters for spectacle fitting, the parameters having been determined on the basis of the image, on the basis of the depth information. Scaling the recorded image on the basis of the depth information makes it possible to achieve a more accurate determination of the parameters for spectacle fitting since in this way the recorded image can correctly reproduce dimensions and these dimensions can be taken from the image.

The method can further comprise rectifying the recorded image on the basis of the depth information. In this case, rectifying should be understood as aligning and/or correcting the recorded image, such that e.g., even in the case of an oblique head position leading to distortions in the image, correct parameters for spectacle fitting are taken from the rectified image.

Detecting the depth information and/or recording an image can be repeated a number of times, wherein the method further comprises a combination of the respective generated items of depth information and/or images, e.g., by an averaging over time. A method suitable for this is described for example in "Rapid Avatar Capture and Simulation using Commodity Depth Sensors"; A. Shapiro, A.

Feng, R. Wang, Hao Li, M. Bolas, G. Medioni, E. Suma in Computer Animation and Virtual Worlds 2014, Proceedings of the 27th Conference on Computer Animation and Social Agents, 05/2014-CASA 2014.

Such averaging makes it possible to increase the accuracy of the determination of the parameters for spectacle fitting. However, a plurality of items of depth information and/or a plurality of images can also be combined differently than by averaging to increase the accuracy. By way of example, this combining can be implemented by temporal fitting of a function (or of a plurality of functions; referred to in English as "fit"), e.g., fitting of a polynomial function or other suitable functions, or else combined spatial and temporal fitting of the function, e.g., of polynomial and spline functions. A fit is implemented by way of a plurality of temporally successively recorded items of depth information or images in the case of temporal fitting of the function and in addition spatially by way of the images or the depth information (e.g., across different parts of the detected face) in the case of combined spatial and temporal fitting. In this case, one or a plurality of corresponding functions are fitted to the items of depth information and/or images, e.g., by fitting of coefficients of the function (e.g., polynomial coefficients in the case of a polynomial function), such that the function is as close as possible to the items of depth information and/or images. Further processing steps can then be carried out on the basis of the function or the functions.

Combining the images or items of depth information, e.g., by averaging or fitting of a function, can be done using a rigid registration method (i.e., a method which uses only rotations and translations) to bring different items of depth information and/or recorded images to congruence. In this case, parts, e.g., measurement data, of the depth information that relate to the same part of the head or parts of the images that relate to the same part of the head are brought to congruence. This is necessary particularly if the head moves between the individual measurements. However, non-rigid methods (i.e., methods which also use other operations such as distortions) can also be used entirely or for some parts of the items of depth information and/or images, e.g., to take account of movements such as eyelid movements, for example the dynamic fusion method (described for example in "DynamicFusion: Reconstruction and tracking of non-rigid scenes in real-time", Richard A. Newcombe, Dieter Fox, Steven M. Seitz; The IEEE Conference on Computer Vision and Pattern Recognition (CVPR), 2015, pp. 343-352).

According to an aspect of the invention, non-rigid methods of this type are used only for regions of the face which either are not relevant to the later determination of parameters or can move rapidly. The two types of registration methods mentioned above for bringing the different measurements (depth information and/or images) to congruence can be carried out independently of one another or in combination.

In this case, the method can further comprise rejecting images and/or items of depth information which satisfy predetermined criteria. The criteria can comprise for example a presence of a head posture that is unsuitable for the measurement, e.g., in such a way that parts of interest such as eyes are not visible, or a presence of a closed eyelid. As a result, images and/or items of depth information that are less suitable for determining the parameters for spectacle fitting (e.g., images in which an eyelid is closed) can be rejected.

The method of the first aspect can further comprise, and the method of the second aspect further comprises: representing a model of the head on the basis of the depth information, and virtually fitting spectacles to the model, wherein the parameters for spectacle fitting are determined on the basis of the virtual fitting. In such a case, it is typical for the person not to wear spectacles during the detection of the depth information and, if appropriate, the images, such that a model of the head without spectacles can be created more easily. Various spectacle frames can then be fitted to this model virtually, i.e., likewise as models e.g., on a display. From the virtual fitting it is then possible to determine the parameters for spectacle fitting, e.g., a type of the spectacles then to be used in reality, dimensions of the spectacles then to be used in reality and/or centration parameters therefor.

It is thus possible here for the detected depth information, if appropriate together with recorded images, also to be displayed as a 3D model of the head on a display. In other words, in this case, a 3D model of the head can be displayed in real time given an appropriate repetition rate of the depth information detection unit, which corresponds to a virtual mirror. This 3D model can then be combined with various virtual spectacle frames to give the person a first impression of the visual effect of various spectacle frames. One of the spectacle frames can then be selected. The type of this spectacle frame can likewise be regarded as a parameter for spectacle fitting. Moreover, it is possible, during such fitting of a virtual spectacle frame, to determine parameters for spectacle fitting which are then used for fitting real spectacles and which describe dimensions of the spectacle frame. This can be done for example by varying such parameters until an optimum fit is attained. Examples of such parameters are e.g., disk width, disk height and bridge width of the spectacle frame. In this regard, by way of example, the bridge of spectacles can be fitted to the shape of the bridge of the nose in the 3D model.

Centration parameters can then likewise be determined on such a selected virtual spectacle frame on the 3D model of the head. In other words, with exemplary embodiments of the present disclosure it is possible to implement centration parameters with real spectacle frames (which are worn by the person during the measurements) or else with virtual spectacle frames (which are fitted to a 3D model of the head).

In addition, provision is made of a computer program having a program code which, when executed on a processor, has the effect that the processor carries out one of the methods described above and/or controls the carrying out thereof. The computer program can be stored on a computer-readable medium.

In accordance with a third aspect, a device for determining parameters for spectacle fitting is provided, comprising a depth information detection unit for detecting depth information with respect to a user's head, the depth information comprising at least one distance between the head and the device, and an evaluation unit configured to determine parameters for spectacle fitting on the basis of the detected depth information.

By determining a distance between the depth information detection unit and the head of the person to be examined, it is possible to compensate for positionings of the person to be examined that deviate from a setpoint position or typical position, during the determination of the parameters for spectacle fitting.

The depth information detection unit can comprise a light field camera. A light field camera of this type is also referred to as a plenoptic camera.

In a manner similar in a way to holographic recording systems, light field cameras capture the so-called light field of a scene. This involves recording not just intensity information, as in the case of a conventional camera, but rather additional information about the direction from which a respective light ray emanates. As a result, in the case of a light field camera, the recorded signal (which is recorded for example with a conventional image sensor) contains both image information and depth information, which are obtained from the intensity information and the information about the direction of the light rays. As a result, a recorded object such as, for example, the person's head can be reconstructed three-dimensionally at least to a certain degree (depending on the implementation of the light field camera), and distances between the head and the light field camera are detected. With such a light field camera it is thus possible for example to combine the functionality of the depth information detection unit and the functionality of a camera. A correspondingly compact construction is possible as a result.

Some embodiments of such light field cameras make use of a multi-microlens array mounted in a defined plane upstream of an image sensor. The individual lenses of the microlens array generate different items of image information on the image sensor. The light field can be reconstructed from the entire image information on the image sensor.

The depth information detection unit can be configured to detect a depth profile of a region of interest of the head. Depth profile is understood to mean an indication of a distance between points of the region of interest and a reference surface (defined e.g., by the depth information detection unit) depending on a position in a plane parallel to the reference surface, for example a position in a recorded 2D image. On the basis of the depth profile, the evaluation unit can display a model of the region of interest as it were as a virtual mirror, which can enable e.g., virtual fitting of spectacles. In this case, it should be taken into consideration that, at the time when the depth information and image information are generated, the user can either wear a spectacle frame or not wear a spectacle frame. For the virtual fitting of spectacle frames it is advantageous for the user not to wear a spectacle frame during recording.

The depth information detection unit can operate on the basis of infrared radiation. As a result, a user is not disturbed by the measurement. An example may be a camera-based infrared depth sensor in which an infrared pattern is generated by a projection system and, by the scene thus illuminated being recorded with an infrared camera, the depth of the objects in the scene can be determined, that is to say that a depth profile of the head can be created, for example. Depth sensors of this type are commercially available. They allow comparatively high frame rates, for example of 30 Hz or 60 Hz.

Patterns in the visible light range can also be used instead of infrared patterns. Methods of this type are also known by the term stripe projection. Here different image patterns and/or image sequences are projected onto a surface (onto the head in this case) and an image of the object is recorded by a camera (which can be the 2D camera mentioned above or can be different from the latter). In this case, the camera is situated at a defined angle with respect to the projection system. As a result of the three-dimensional surface of the measurement object, here of the head, and the triangulation baseline (that is to say distance between the projector and the camera), the patterns imaged on the image sensor of the camera appear altered or deformed, from which the depth information and the topography of the illuminated surface can in turn be determined. In particular, the distance between the head and the depth information detection unit can thus also be determined. The use of infrared light as described above is preferred, however, since in this case a normal image recording is not disturbed and, for example, the user is not put off by the light patterns either.

The depth information detection unit can comprise a time-of-flight sensor used to determine the distance by way of a time of flight of a signal, wherein the time of flight can be measured directly or in the form of a phase shift.

In the case of such time-of-flight sensors, essentially a signal is sent from the depth information detection unit to the head and a signal reflected from the head is detected. From the time of flight of the signal to and from the head and the velocity of the signal it is then possible to determine the distance, wherein this can also be carried out at a multiplicity of points for example with a scanning method. Instead of the time of flight being measured directly, often—particularly if light pulses are used as a signal—a phase difference between a modulation of the reflected ray and a corresponding modulation of the reference ray derived from the transmitted ray is determined.

However, other types of signals, for example ultrasonic signals, can also be used instead of light pulses.

According to an aspect of the invention, use is made of time-of-flight sensors which are used by so-called time-of-flight cameras having laterally resolving depth sensors. Examples of suitable sensors for time-of-flight cameras of this type are photomixing detector sensors (PMD sensors; from the English term "Photonic Mixing Device"). These sensors use a modulated light signal, for example infrared light, to illuminate the head and detect the reflected light with the PMD sensor, which is likewise coupled to a modulation source used for the modulation. Here the time of flight is thus measured indirectly by way of a phase shift.

With corresponding time-of-flight sensors it is possible here to scan objects such as the head with a high frame rate of, for example, in the range of 30 to 60 Hz and high resolution, such that items of depth information can be made available with frame rates comparable to a video rate. In this case, an entire depth profile of the head can be created.

Time-of-flight sensors of this type thus make it possible to determine depth information with a high frame rate and/or a high accuracy. A robust detection of the depth information, largely independently of room lighting, etc., can thus be realized as well, since e.g., it is not necessary to find corresponding points in stereo image pairs.

Another type of depth information detection units which can be used in exemplary embodiments uses a distance measurement by means of optical triangulation, for example laser triangulation. The principle of optical triangulation is based on a light spot being generated on the object to be measured (the head or a part thereof in the present case) with a laser, a light emitting diode (LED) or some other light source. This can be done in the visible range or else in the infrared range. The light spot is imaged via a camera, for example a CCD (charged coupled device) camera, a CMOS camera or a linear-array camera. The light source and the camera are situated at a defined angle with respect to one another. On account of the trigonometrical relationships, the distance to the object to be measured can be determined from the displacement of the imaged light spot on the sensor, that is to say the position of the light spot on the sensor. In particular, the light spot is displaced in the image with increasing distance to the object to be measured in a direction from the light source to the camera since, on account of the angle between light source and camera, with increasing distance the light also covers a greater path distance in the direction of the camera.

A measurement of this type can also be carried out line by line. For this purpose, by way of example, a laser line is projected onto the head. From a camera image of the laser line, it is then possible to communicate the depth information along the laser line in particular on the basis of displacements perpendicular to the direction of the laser line. It is thus possible to determine the topography of the head along the line. With a scanning system in which the laser line moves over the head, the entire head or a part of interest thereof, for example an eye portion including spectacles, can then be measured.

In this case, particularly with the use of a laser light source, care should be taken to ensure that the eyes of the person to be examined cannot be damaged by the laser. In particular, the intensity of the laser should be chosen to be sufficiently low. Infrared light is typical here.

A camera for such an optical distance measurement by triangulation may be a camera that is separate from a 2D camera that is additionally present, if appropriate, for the image recording. It is also possible to use a single camera unit, which, by way of example, with the use of visible light, can use regions outside the abovementioned laser line or other light lines for the image recording and can simultaneously record the laser line or, with the use of infrared light, can be switchable periodically between the measurement of depth information and the recording of an image for example with a switchable filter. In other exemplary embodiments, no image recording at all is carried out using a 2D camera, rather only a scanning system as described above, for example, in which a laser line is moved over the head, is used to determine an entire depth profile and thus the topography of the head.

In a further exemplary embodiment, the depth information can also be determined by triangulation by a stereo camera method. In contrast to U.S. Pat. No. 7,740,355 B2 explained in the introduction, here a pair of cameras is used not just for determining a 3D model, rather a distance between the head and the stereo cameras is explicitly determined as well. Two cameras arranged at a predefined angle with respect to one another or a plurality of cameras arranged at a plurality of predefined angles with respect to one another are used in this case.

With use of two cameras, such as a stereo camera system, the depth determination for an object point is carried out by way of a determination of the parallax of the respective object point in the two camera images, that is to say a displacement of object points between the camera images. The error of such a depth measurement is proportional to the square of the distance between the cameras and the head and inversely proportional to the stereo base, that is to say the distance between the two cameras. Consequently, here the stereo base must become sufficiently large enough to achieve, for typical distances during operation of the device, a sufficient accuracy to obtain the depth information. In this case, "sufficient accuracy" means, in particular, that the parameters for spectacle fitting can be determined with an accuracy that is desired or required for the spectacle fitting.

Since corresponding points or regions in the two image recordings have to be identified in this procedure, that region of the head which is to be examined has to have enough structure (in particular lines or edges) to be able to identify such a correspondence with a method used for this purpose. Objects for which this usually proceeds well are eyes, eyebrows, nose and other distinctive facial features. In some exemplary embodiments, moreover, another structure can be projected onto the head, for example binary patterns, lines, points, etc., to facilitate the identification of corresponding regions.

In the case where the depth information detection unit is implemented e.g., as a time-of-flight sensor or as a light field camera, a more compact construction than with a stereo camera system, for example, is possible, however, since no angle between two cameras need be provided. Consequently, time-of-flight sensors, light field cameras and the like as depth information detection units, in cases in which a compact construction is of importance, are typical vis-à-vis a stereo camera system.

The present disclosure is not restricted to the types of depth information detection units described above. It is also possible to use depth information detection units having other depth sensors, for example—as already mentioned—ultrasonic depth sensors, depth sensors that carry out a depth measurement with optical coherence tomography (OCT), confocal sensors or chromatic confocal sensors. Overall it is possible to use any conventional depth sensor which can detect depth information in relation to the head, in particular in relation to the eye portion and the spectacles, sufficiently accurately and at the same time poses no danger to the user's eyes (for example owing to excessively intensive radiation). "Sufficiently accurately" means once again that ultimately the parameters for spectacle fitting can be determined with an accuracy that is desired or required for spectacle fitting.

In addition to the depth information detection unit, the device further comprises a 2D camera as well, i.e., a (conventional) camera for recording two-dimensional images with an image sensor, for recording an image of at least one part of the head. As a result, additional information for determining the parameters for spectacle fitting is available, for example dimensions of the person's head that are taken from the image.

In this case, the evaluation unit can be configured for scaling the images on the basis of the depth information and/or for scaling parameters for spectacle fitting, the parameters having been determined on the basis of the images, on the basis of the depth information, as already explained above.

The evaluation unit can additionally be configured for rectifying the images on the basis of the depth information, as already explained above.

The device is configured in such a way that the depth information detection unit and the 2D camera detect the head via a common optical axis. In this case, in the case of the depth information detection unit, the optical axis corresponds to an axis on which the depth information is detected, that is to say as it were to a "viewing direction" of the depth information detection unit. If the depth information detection unit uses an imaging optical unit, then the optical axis corresponds to the optical axis of the imaging optical unit, usually a straight line connecting all centers of curvature of refractive or specularly reflective surfaces of the imaging optical unit. Light rays on the optical axis pass through the imaging optical unit without deflection. In the case of the 2D camera, the optical axis corresponds to the optical axis of the lens of the 2D camera, in a manner corresponding to the above explanation for an imaging optical unit.

In some exemplary embodiments, a beam splitter can be used for combining and separating the optical axes of depth information detection unit and 2D camera. The beam splitter can be a wavelength-selective beam splitter. In exemplary embodiments of this type, by way of example, the 2D camera can record visible light, while the depth information detection unit operates on the basis of infrared radiation. In other exemplary embodiments, the beam splitter is not wavelength-selective, and the 2D camera and the depth information detection unit use at least partly an identical part of the spectrum. By virtue of such an arrangement, a more compact device than with a stereo camera or the like can be achieved since no corresponding angle for example between image recording units need be provided. Moreover, depth information and image information of the camera are recorded from the same direction, as a result of which a perspective correction of the depth information relative to the image data can be obviated.

The evaluation unit can be configured to determine a head position of the head on the basis of the depth information, wherein determining the parameters for spectacle fitting is carried out on the basis of the determined head position.

The device can be configured to repeat a number of times the process of detecting the depth information with the depth information detection unit and/or the process of recording the images using the 2D camera, wherein the evaluation unit is then configured for combining a plurality of detected items of depth information and/or a plurality of recorded images, e.g., in the form of an averaging as described above.

The evaluation unit can further be configured for rejecting images and/or items of depth information which satisfy predetermined criteria.

The evaluation unit can further be configured to represent a model of the head on the basis of the items of depth information e.g., on a display, and to enable virtual fitting of spectacles to the model, wherein the evaluation unit is configured to determine the parameters for spectacle fitting on the basis of the virtual fitting.

BRIEF DESCRIPTION OF THE DRAWINGS

The disclosure will now be described with reference to the drawings wherein.

DESCRIPTION OF EXEMPLARY EMBODIMENTS

Various exemplary embodiments of the present disclosure are explained in detail below.

Figure 1:
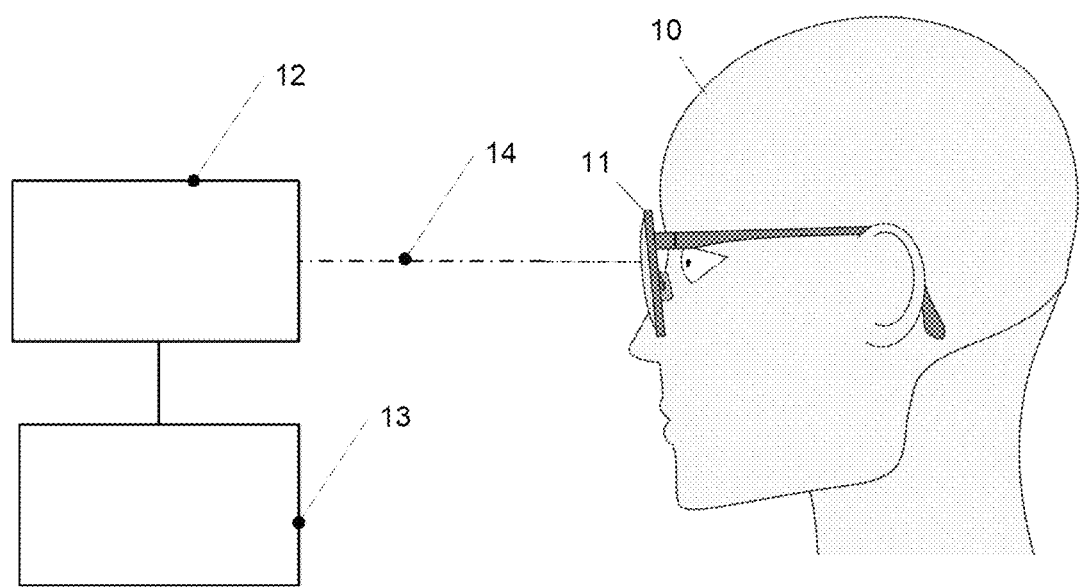
FIG. 1 shows a schematic illustration of a device in accordance with one exemplary embodiment.

FIG. 1 schematically illustrates a device for determining parameters for fitting spectacles (i.e., parameters which can be used for fitting spectacles to a person's head) in accordance with one exemplary embodiment. The device in FIG. 1 comprises a depth information detection unit 12 for determining depth information with respect to a user's head 10, in particular for determining depth information in relation to an eye portion, that is to say a region around the user's eyes, thereof. In this case, the user in FIG. 1 is wearing spectacles 11, with respect to which depth information can likewise be determined.

In this case, depth information within the meaning of the present application comprises at least one item of information in relation to a distance between the user, in particular the user's head 10 and/or the spectacles 11 worn by the user, and the depth information detection unit 12. By way of example, the length of the dash-dotted line 14 in FIG. 1 can be determined as the distance. It is possible however to measure distances also with respect to other and/or a plurality of locations of the head 10. In one exemplary embodiment, a depth map, as it were, is created in this case, for example by determining the above-described distance for a multiplicity of points of the head 10, in particular of the eye portion, and/or a multiplicity of points of the spectacles 11. Information about such a distance is thus present as a result of the depth information provided by the depth information detection unit 12. The information can be used hereinafter to determine parameters for fitting the spectacles 11 to the user's head 10, for example for centration of spectacle lenses, independently of the exact position of the head 10. Examples of suitable depth information detection units and of parameters to be determined will be explained in even greater detail later.

The device in FIG. 1 further comprises an evaluation unit 13, which receives the depth information from the depth information detection unit 12 and determines parameters for fitting the spectacles 11 on the basis of the depth information. In this case, the evaluation unit 13 can be embodied for example as a correspondingly programmed computing unit, for example in the form of a computer. However, it is also possible to use hardwired hardware components such as application-specific integrated circuits (ASICs). In an inherently conventional manner, the evaluation unit 13 can comprise output means such as a display, loudspeakers, interfaces for outputting signals and the like to output the determined parameters for spectacle fitting or to forward them to other units. Details of the determination of the parameters for spectacle fitting will likewise be explained in even greater detail later.

It should be noted that the depth information detection unit 12 and the evaluation unit 13 of the device according to the disclosure can be arranged locally close together, for example in a common housing or else in separate housings situated in a fixed spatial arrangement with respect to one another. However, the evaluation unit 13 can likewise also be arranged spatially separately from the depth information detection unit 12, and the depth information determined by the depth information detection unit 12 can be transmitted to the evaluation unit 13 conventionally in a wireless manner, in a wired manner or else via optical lines such as optical fibers. A transmission of this type is also possible for example via networks such as the Internet, such that substantially arbitrary distances between the depth information detection unit 12 and the evaluation unit 13 are possible.

Before various details of depth information detection units, parameters for spectacle fitting and the determination thereof are explained more specifically, variations and extensions of the exemplary embodiment in FIG. 1 will now firstly be discussed with reference to FIGS. 2 and 3. to avoid repetition, in the following description identical or mutually corresponding elements in different FIGS. bear the same reference signs and are not repeatedly explained in detail.

Figure 2:
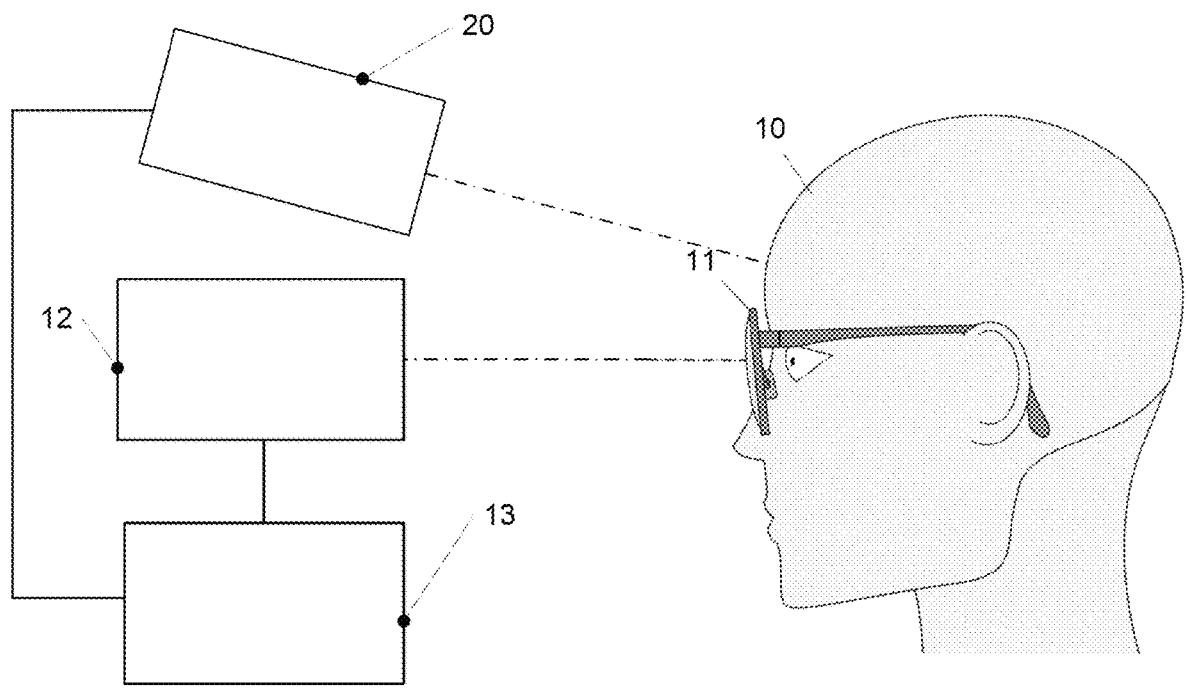
FIG. 2 shows a schematic illustration of a device in accordance with a further exemplary embodiment.

In the case of the device in FIG. 2, the device from FIG. 1 is extended by a camera 20, which records a two-dimensional image, for example a black-and-white image or a color image, of the head 10 or of a part thereof, for example an eye portion. The camera 20 can be implemented in a conventional manner with a lens and an image sensor.

The image thus recorded is likewise fed to the evaluation unit 13. In this case, the evaluation unit 13 determines the parameters for spectacle fitting additionally on the basis of the recorded image. In this case, the evaluation unit 13 can additionally control the camera 20 and the depth information detection unit 12 such that the image is recorded simultaneously with the depth information.

For evaluation purposes, in one variant, by way of example, the image recorded by the camera 20 can then be scaled on the basis of the depth information detected by the depth information detection unit 12. By way of example, a scaling of this type can be carried out with a higher scaling factor if the depth information indicates that the head 10 is further away from the depth information detection unit 12, and with a smaller scaling factor if the head is closer to the depth information detection unit 12. The scaling factor can indicate a magnification or a reduction.

In this way, in particular, the image can be scaled such that dimensions of the head 10 are able to be taken from the image sufficiently accurately, which dimensions can correspond to the parameters to be determined for spectacle fitting or on the basis of which dimensions such parameters for spectacle fitting are determinable. "Sufficiently accurately" means that ultimately the parameters for spectacle fitting are determinable with an accuracy that is desired or required for spectacle fitting. Instead of a scaling of the image, in another variant, corresponding dimensions can likewise also be taken from the recorded image, and the dimensions taken can then be scaled on the basis of the depth information.

In FIG. 2, the camera 20 is illustrated as separate from the depth information detection unit 12. In some exemplary embodiments, however, the camera 20 can also simultaneously serve as part of the depth information detection unit 12, for example in the case of stripe projection or laser triangulation, as will be explained in greater detail later.

In the exemplary embodiment in FIG. 2, the camera 20 and the depth information detection unit 12 operate at different angles and with different optical axes, as illustrated. In other exemplary embodiments, a construction is provided in which depth information detection unit 12 and camera 20 view the head 10 coaxially. A corresponding exemplary embodiment is illustrated in FIG. 3.

Figure 3:
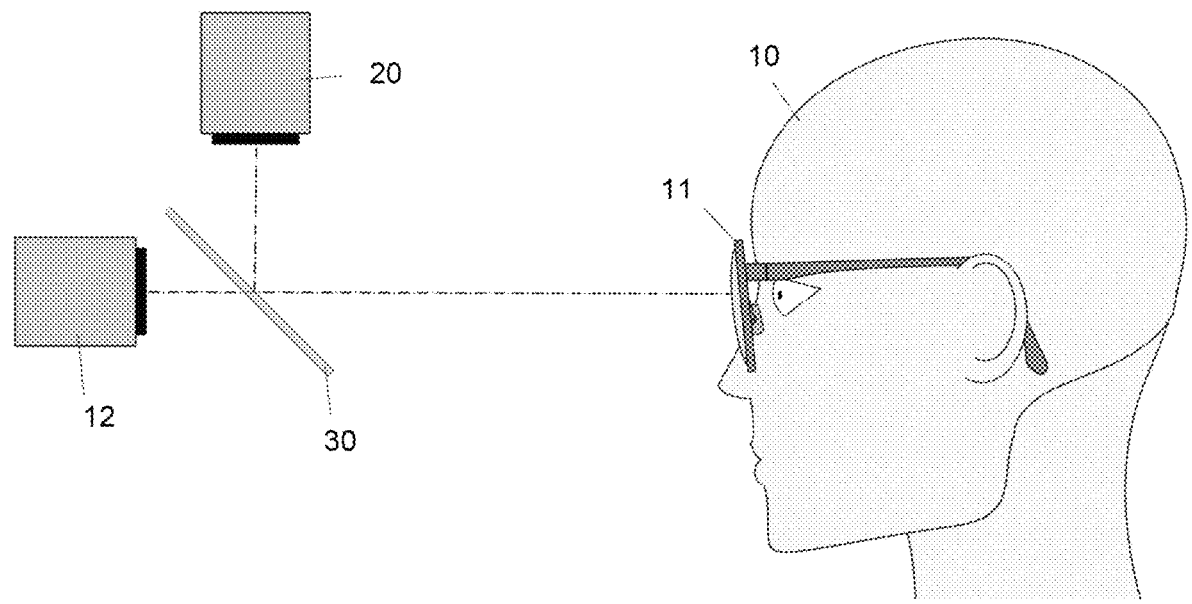
FIG. 3 shows a schematic illustration of a device in accordance with a further exemplary embodiment.

In FIG. 3, as in the exemplary embodiment in FIG. 2, a depth information detection unit 12 and a camera 20 are provided. In the exemplary embodiment in FIG. 3, a beam splitter 30 is additionally provided, which combines the optical axis of the camera 20 with the optical axis 12 of the depth information detection unit 12, such that the head 10 is viewed or measured on a single optical axis. By this means, too, a compact construction is possible. Moreover, parallax errors and the like between the depth information and the image recorded by the camera 20 are avoided or reduced. In the exemplary embodiment in FIG. 2, by contrast, such parallax errors and the like can be eliminated computationally by the evaluation unit 13.

The beam splitter 30 can be a wavelength-selective beam splitter. In exemplary embodiments of this type, by way of example, the camera 20 can record visible light, while the depth information detection unit 12 operates on the basis of infrared radiation. Alternatively, the beam splitter 30 is not wavelength-selective, and the camera 20 and the depth information detection unit 12 use at least partly an identical part of the spectrum.

Even though FIG. 3 does not explicitly illustrate this, here as well the depth information provided by the depth information detection unit 12 and one or a plurality of images provided by the camera 20 can be evaluated by an evaluation unit as explained for the evaluation unit 13 from FIG. 1, to obtain parameters for spectacle fitting.

Next, various types of depth information detection units which can be used to obtain the depth information will be explained in greater detail.

By way of example, time-of-flight or phase angle measurements can be used for obtaining the depth information. In methods of this type, as explained furtherabove, essentially a signal is sent from the depth information detection unit to the head and a signal reflected from the head is detected. With corresponding time-of-flight sensors it is possible here to scan objects such as the head 10 with a high frame rate of, for example, in the range of 30 to 60 Hz and high resolution, such that the depth information can be made available with frame rates comparable to a video rate. In this case, an entire depth profile of the head can be created. On the basis of such depth profiles, as in the exemplary embodiment in FIG. 1, parameters for spectacle fitting can be determined in principle even without the use of a further camera such as the camera 20.

Figure 4:
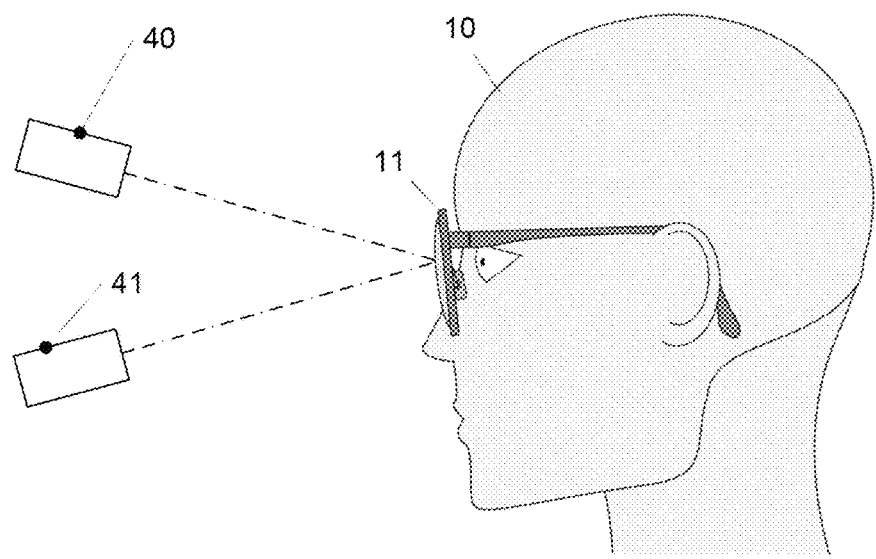
FIG. 4 shows a schematic illustration for elucidating depth sensors that are able to be used in the exemplary embodiments.

FIG. 4 schematically shows a depth information detection unit which can serve as a schematic illustration for various usable types of depth information detection units. In the case of a time-of-flight sensor, 40 denotes a signal source, for example a modulated light source, and 41 denotes a corresponding sensor for detecting the received light, for example a time-of-flight camera as described above.

As likewise already explained, a further type of depth information detection units which can be used in exemplary embodiments uses a distance measurement by optical triangulation, for example laser triangulation. In the case of FIG. 4, with a triangulation unit of this type, for example, 40 may denote a light source and 41 a camera, which are situated at a defined angle with respect to one another.

A further possibility for implementing the depth information detection unit 12 is the use of a light field camera.

Further possibilities for implementing a depth information unit include, as described, a camera-based infrared depth sensor, in which an infrared pattern is generated by a projection system and, with the scene thus illuminated being recorded by an infrared camera, the depth of the objects in the scene is determined. As likewise described, it is also possible to use stripe projection with visible light.

In the case of FIG. 4, here then for example the element 40 would be the projection system, and the element 41 the camera, which can be identical with the camera 20 or different therefrom.

In a further exemplary embodiment, as described, the depth information can also be determined by triangulation by a stereo camera method. In this case, two or more cameras are arranged at one or a plurality of predefined angles. In the case of FIG. 4, with a depth information detection unit of this type, for example, 40 is a first camera and 41 is a second camera.

Figure 5:
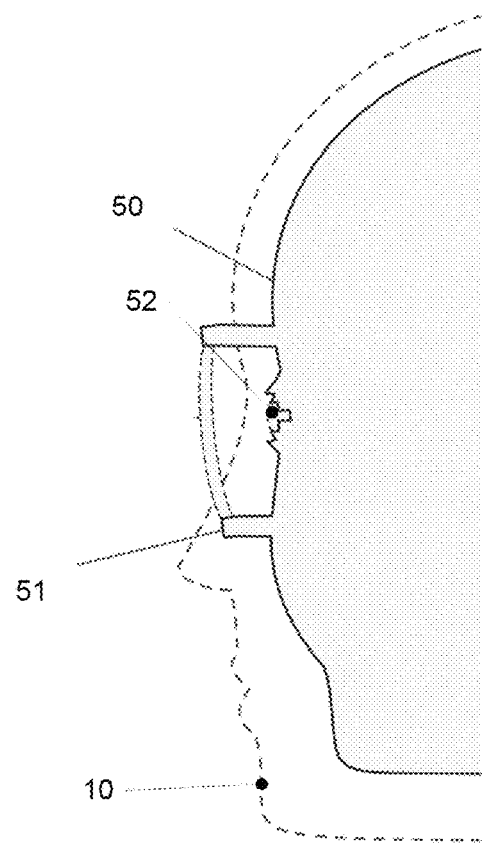
FIG. 5 shows an illustration of a section through a depth profile such as is able to be generated in some exemplary embodiments.

The use of such depth sensors as described above makes it possible, with corresponding high-resolution depth sensors, to model a profile of the head 10 and thus the three-dimensional surface of the head 10 based on the depth information detection unit alone. As an example, FIG. 5 shows a schematic illustration of a section 50 through a 3D model of this type, in which a section 51 through the spectacles is also visible. The section 50 in the example in FIG. 5 is placed through an eye 52 of the user, that is to say does not extend through the center of the subject's face, but rather through the center of the eye. 10 denotes the profile of the head as illustrated in FIGS. 1-4, wherein this profile extends through the central axis of the head and thus differs from the profile 50.

On the basis of the depth information, which includes a distance between the depth information detection unit and the head 10, it is possible to create a true-to-size three-dimensional profile of this type of the head 10, with corresponding sections 50 at the various locations. Parameters for spectacle fitting such as centration parameters can in turn be determined therefrom. This is explained in greater detail below.

Firstly, variously determinable parameters for spectacle fitting, in particular centration parameters, will be explained here with reference to FIGS. 6A to 6F. FIGS. 6A to 6F here show in each case views of spectacles, if appropriate together with a partial view of a head, to elucidate various parameters.

Figure 6A:
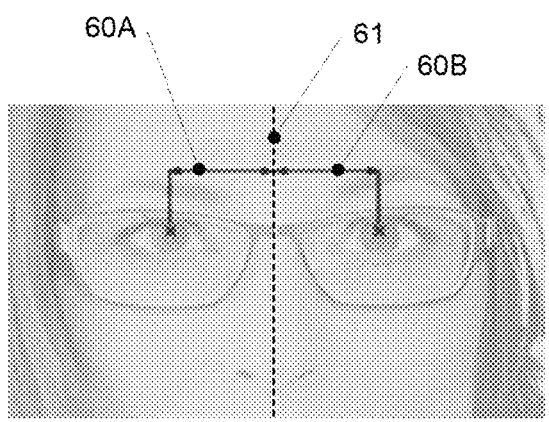
FIGS. 6A to 6F show illustrations for elucidating parameters for spectacle fitting.

FIG. 6A shows the monocular pupillary distance when looking to infinity. An arrow 60A shows the monocular pupillary distance for a left eye, measured as the distance between the pupil and a central axis 61 of the head. An arrow 60B shows the monocular pupillary distance for the right eye. The values for the left and right eyes are different in most cases.

Figure 6B:
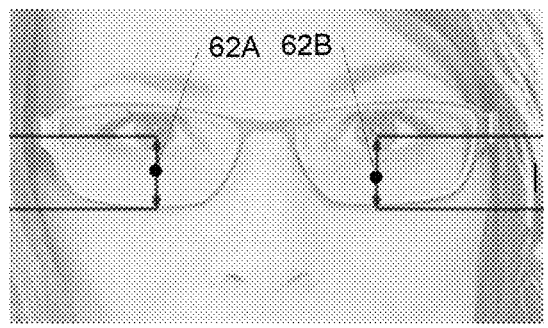

FIG. 6B illustrates the fitting height, measured in turn when looking to infinity, wherein the requirement of the fulcrum of the eye was satisfied. The requirement of the fulcrum of the eye means that the optical axis of the spectacle lens should extend through the fulcrum of the eye. In this case, the optical axis extends through the optical midpoint of the spectacle lens and is generally perpendicular to the spectacle lens. This can minimize undesired prismatic effects if eye movements result in viewing through different parts of a spectacle lens. The fitting height indicates the distance between the pupil and a lower edge of the spectacle lens. An arrow 62A shows the fitting height for the right eye, and an arrow 62B shows the fitting height for the left eye.

Figure 6C:
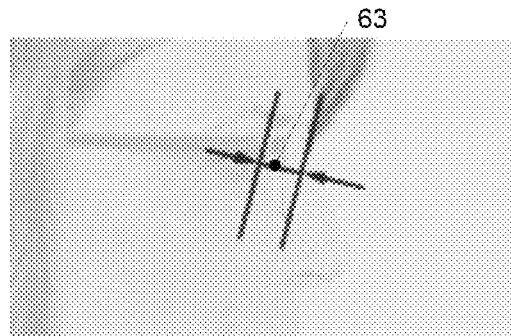
Figure 6D:
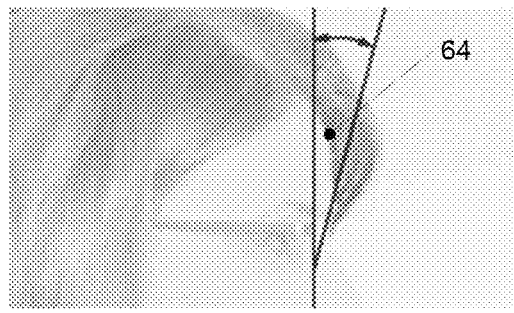

In FIG. 6C, 63 denotes the corneal vertex distance, which is generally measured from the back side of the spectacle lens of the spectacles to a vertex plane of the cornea of the eye. In FIG. 6D, an angle 64 denotes the forward inclination of the frame, essentially an inclination of the spectacles with respect to the perpendicular. The inclination, like the fitting height shown in FIG. 6B, too, also depends on the person's head posture.

Figure 6E:
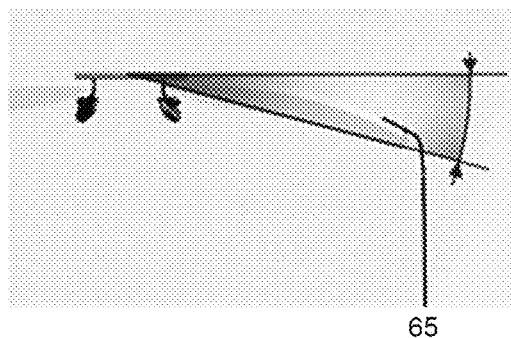

In FIG. 6E, an angle 65 denotes the frame disk angle, an angle at which the spectacle lens is situated compared with "planar" spectacles. Finally, FIG. 6F also indicates various dimensions of the spectacle frame itself 67 denotes the disk width, and 68 the disk height. Disk width and disk height together with pupillary distance and fitting height are important items of information for determining a required lens diameter of a spectacle lens. 66 additionally denotes the bridge width of the spectacle frame.

FIGS. 6A to 6F show some parameters for spectacle fitting which can be determined with the devices illustrated. Further parameters for spectacle fitting can also be determined. By way of example, for the centration of spectacle lenses for near vision (for example for reading spectacles or spectacles for work) and for the centration of progressive lenses there may be further parameters which can be determined. These include for example the "near pupillary distance", which is not measured with viewing direction infinity as described above, but rather when looking at an object situated near and in front of the head.

Figure 6F:
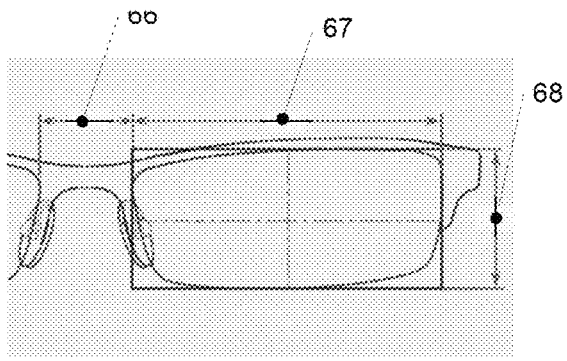

Besides the parameters for spectacle fitting illustrated in FIG. 6F, it is also possible to determine other items of geometric information about the spectacle frame. These items of geometric information may be important for the selection of suitable spectacle lenses since they influence the lens thickness for example in the case of spectacle lenses having positive optical power.

The requirement of the fulcrum of the eye is generally satisfied at least in the centration of single vision lenses. In the case of height centration, that is to say the alignment of the optical axis of the spectacle lens in the height direction, the head posture must be taken into account here since the inclination of the head influences the measurement of the fitting height and also the forward inclination of the frame. to take this into account, by way of example, in the case of a measurement with the discussed device with the person's head posture it is possible to ensure that the plane of the spectacle frame is perpendicular to the ground, which is also referred to as the zero viewing direction. In this state, the discussed device is then used to determine the position of the pupils in the plane of the spectacle lens. It is likewise possible to determine the fitting height with natural head and body posture, wherein the person to be examined usually looks at the ground at 8 to 10 m, which is also referred to as the main viewing direction. As will be explained in greater detail below, the head posture can also be determined with the device according to the disclosure, and the person to be examined can be instructed, if appropriate, to change the head posture.

The procedures for determining centration parameters on the basis of the depth information and, if appropriate, on the basis of a camera image (recorded for example by the camera 20 of the exemplary embodiments above) will now be explained in greater detail below with reference to FIGS. 7 to 10.

Figure 7:
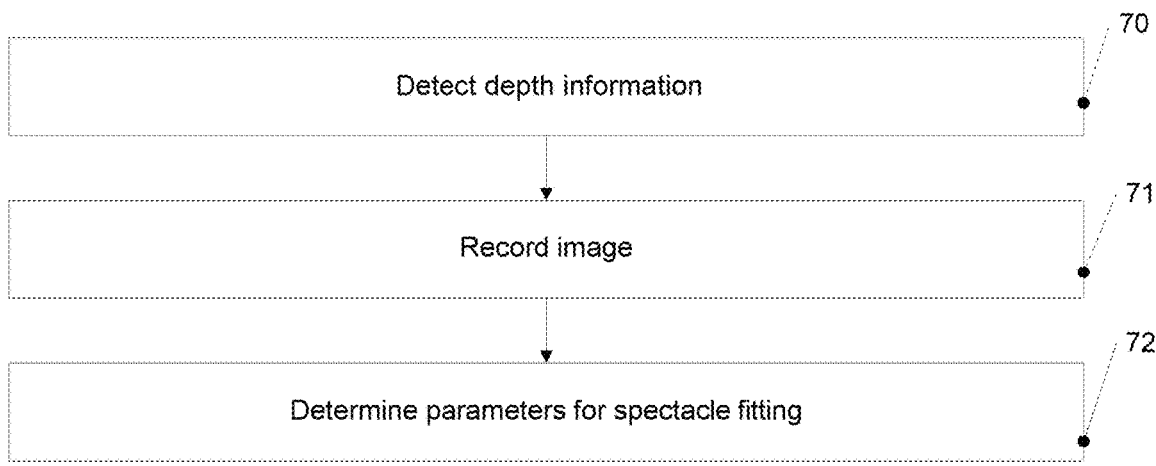
FIG. 7 shows a flow diagram for elucidating a method in accordance with one exemplary embodiment.
Figure 8:
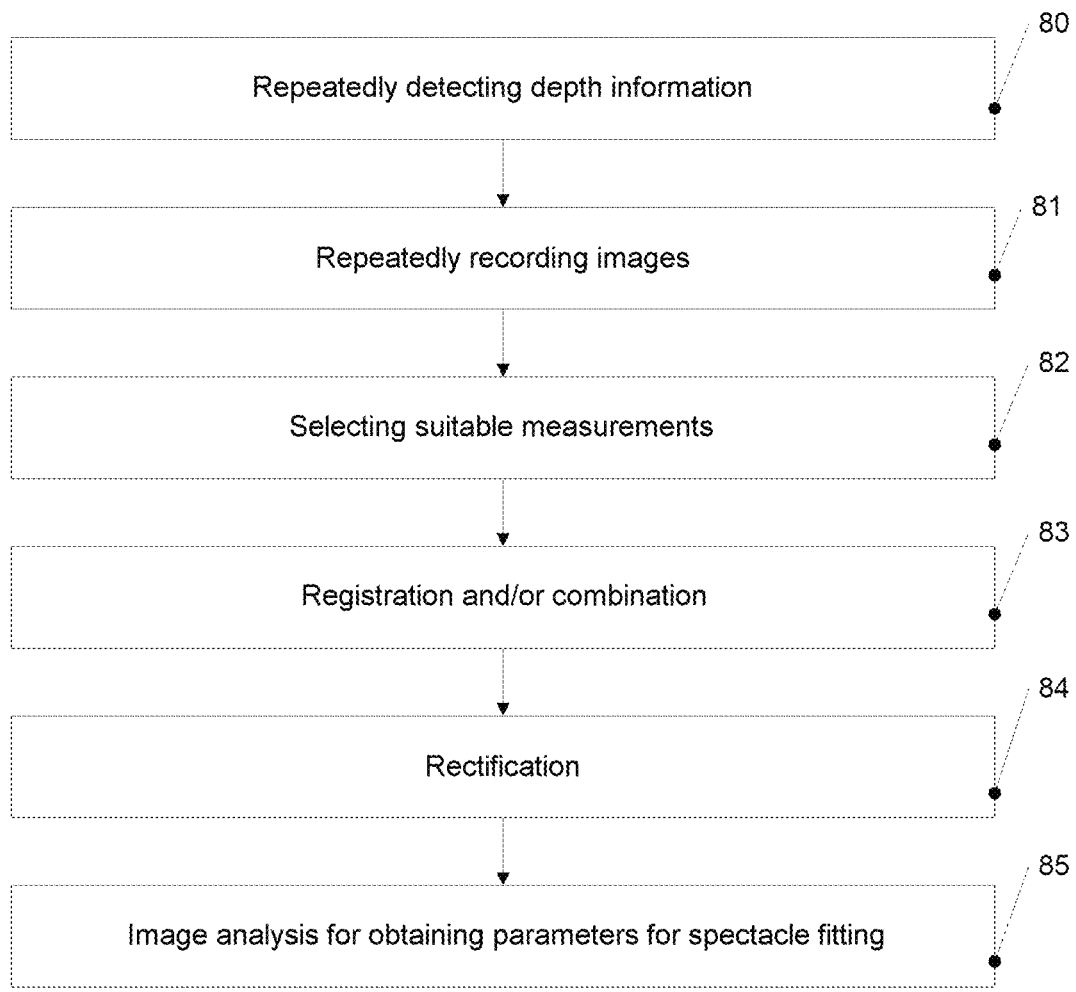
FIG. 8 shows a flow diagram for elucidating a method in accordance with a further exemplary embodiment.

FIG. 7 shows a flow diagram that gives an overview of a method in accordance with one exemplary embodiment for determining parameters for spectacle fitting. FIG. 8 then shows a detailed flow diagram illustrating various possible details of a method of this type. While the methods are illustrated as a sequence of steps, the order illustrated should not be interpreted as restrictive. In particular, some steps can also be carried out in a different order or one or more steps can also be carried out in parallel. By way of example, depth information and an image can be recorded simultaneously by a depth information detection unit such as the depth information detection unit 12 from FIG. 2 and a camera such as the camera 20 from FIG. 2 or else by a light field camera as explained above.

A step 70 in FIG. 7 involves detecting depth information comprising a distance between a head and a unit used for detecting the depth information. This can be done using depth information detection units 12 as discussed above.

Step 71 involves additionally capturing an image (also referred to as overview image) of at least one region of interest, for example an eye portion, of a head. Step 71 is optional, and, in some exemplary embodiments, only the depth information is detected in step 70. Parameters serving for spectacle fitting, in particular spectacle lens centration, are then determined in step 72. By way of example, one or more of the parameters discussed with reference to FIGS. 6A to 6F can be determined.

For this purpose, in some exemplary embodiments, a true-to-size 3D model of the head with spectacles is created from the detected depth information, and the parameters are then read off from this 3D model. In addition, if an overview image was captured, the overview image can be registered to the 3D model, for example be used to give texture to the 3D model. This facilitates the recognition of individual features such as the eyes, for example. Procedures for recognizing features of this type such as the eyes, the spectacle frame and the like, which are required for determining the parameters, are inherently known for example from conventional photography, where various face recognition algorithms are used. The distance between the head and the depth information detection unit can be used here to ensure a correct size of the 3D model even in the case of a positioning of the head that does not correspond to a predefined setpoint position.

In other exemplary embodiments, the depth information can even comprise just a single distance between the head and the device at a single point, and an overview image is additionally recorded. Depth information of this type can be provided by a relatively simple depth sensor which, for example, need not be embodied in scanning fashion. In this case, the distance thus determined is used to scale the image with a scaling factor, which is dependent on the distance and which essentially results directly from the intercept theorem. In this regard, the recorded image can be scaled to a correct size, and dimensions such as the dimensions illustrated in FIGS. 6A to 6F can be taken from the overview image thus scaled. In this case, depending on the recording direction for an individual image only some parameters need be determined. By way of example, parameters in FIGS. 6A, 6B and 6F can be determined from a frontal recording, while an image from the side has to be produced for the parameters in FIGS. 6C and 6D. Depending on parameters to be determined, therefore, if appropriate a plurality of image recordings are carried out in such a case.

In some exemplary embodiments, therefore, the depth information compensates for the fact that the size of the head of the person to be examined or of relevant parts thereof changes depending on a distance between the head and the camera used. By way of example, the head appears larger if it is situated closer to the camera, and smaller if it is situated at a distance from the camera.

Various details and extensions of the method from FIG. 7 will now be discussed with reference to FIG. 8. While FIG. 8 and the following description explain various possible extensions and details in combination, it should be noted that these can also be realized independently of one another, that is to say need not necessarily be implemented in combination with one another.

Step 80 involves repeatedly detecting depth information, and, optionally, step 81 involves repeatedly recording image information. Steps 70 and 71 from FIG. 7 are thus carried out repeatedly. As already explained, some depth sensors offer high frame rates in the region of 30 Hz or 60 Hz, that is to say in the region of typical video rates, and cameras can also record image information at such rates. However, lower frame rates are also possible. These measurements in 80 and 81 can be analyzed in real time at least in relation to some aspects by appropriately equipped computers.

As already explained, from items of depth information repeatedly detected in this way, a model of the head can then be created and displayed on a display, which enables for example fitting of a virtual spectacle frame as described. Moreover, the items of depth information can be used for aligning the head, as described.

In step 82, suitable measurements can then be selected from the measurements carried out in 80 and 81. In this regard, disadvantageous images or items of depth information can be excluded for the later determination of the parameters for spectacle fitting. By way of example, the position of the pupil, which is required for example for the parameters illustrated in FIGS. 6A and 6B, can be determined only inaccurately with the eyelid closed. Therefore, with corresponding detection of facial features (also referred to as Facial Feature Detection or Landmark Detection in the literature in English) it is possible to determine in which images or in which items of depth information one or both eyelids are closed, and corresponding data can be rejected for the subsequent processing steps. It should be noted here that detecting the items of depth information and recording the images in 80 and 81 can also be carried out in a synchronized manner, such that a set of depth information is assigned for example to a respective image. If it is ascertained for example in the image that the eyelid is closed, the associated depth information can also immediately be rejected. Conversely, if it is ascertained for example in the depth information that the head was turned to an extent such that a reasonable determination of desired parameters for spectacle fitting is possible only with difficulty or is not possible, the corresponding image can also be rejected.

Next, a combination of a plurality of measurements and/or a registration of data to one another can be carried out in step 83. In this case, registration is generally understood to mean a process in which a plurality of data sets is brought to congruence or aligned with one another. In so-called rigid registration methods, in this case the topography of the individual measurements is not altered, i.e., distances and angles are maintained, rather the individual measurements are brought to congruence with one another only by rotation and translation.

In this way, a plurality of measurements carried out in succession (in steps 80 and 81 in FIG. 8) can be combined after registration, which can bring an improvement in accuracy in particular in relation to the items of depth information. The parameters for the registration can be determined by conventional optimization methods, for example the ICP (Iterative Closest Point) algorithm for data without a texture, homographic estimation, for example with a DLT algorithm for image data (direct linear transformation; for example, for image data recorded by a camera).

However, such rigid registration methods for combination can be problematic in the case of variable facial regions (for example moving eyelids) since a disadvantageous registration in particular for representation purposes on a display or the like can take place here. In exemplary embodiments, therefore, for such image regions or regions of the items of depth information in which rapid changes can typically occur (in particular eyelid, eye movements and the like), non-rigid methods are used.

Step 84 then involves determining a head posture in the measurements from steps 80 and 81. The head posture can then be used to rectify recorded images, or else be used for correction for example in some other way during the determination of the parameters for spectacle fitting.

In one exemplary embodiment, in this case, with registration methods such as those explained above in relation to step 83, the head of the recorded person is registered with a standard head (that is to say a 3D model of a head of a shape defined as standard) and the posture of the standard head is determined with respect to a reference coordinate system of the device. The reference coordinate system is also determined as a world coordinate system. For this purpose, one exemplary embodiment involves determining the rigid transformation which transforms the standard head given in its own reference system into a standard head in the world coordinate system, such that the best possible correspondence to the measurement data of the depth information detection unit is achieved. This transformation can be described for example with the aid of the following six parameters: translation in x-, y- and z-directions, and rotation about x-, y- and z-axes (for example according to Euler's formula), wherein x, y and z describe axes of a world coordinate system.

Figure 9:
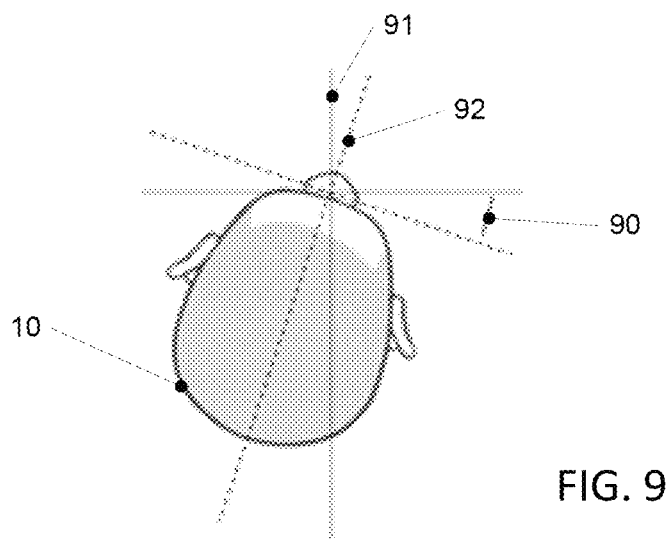
FIGS. 9 and 10 show illustrations for elucidating a rectification such as is carried out in some exemplary embodiments.

As an example, FIG. 9 illustrates a head 10 that is rotated by an angle 90 about the z-axis (perpendicular to the image plane). 91 denotes the central axis of a head aligned straight, and 92 denotes the central axis of the head 10. Here the angle 90 would thus be determined by the registration. Translations or rotations of the head 10 about the x- and/or y-axis can also be determined in a corresponding manner.

The head posture thus described with these six parameters is then used in step 85, described below, to correct a possible oblique position of the viewing direction toward the device. In this way, it is possible for example to correct a viewing point, that is to say the intersection point of the person's respective visual axis with a plane of the spectacle lens.

Figure 10:
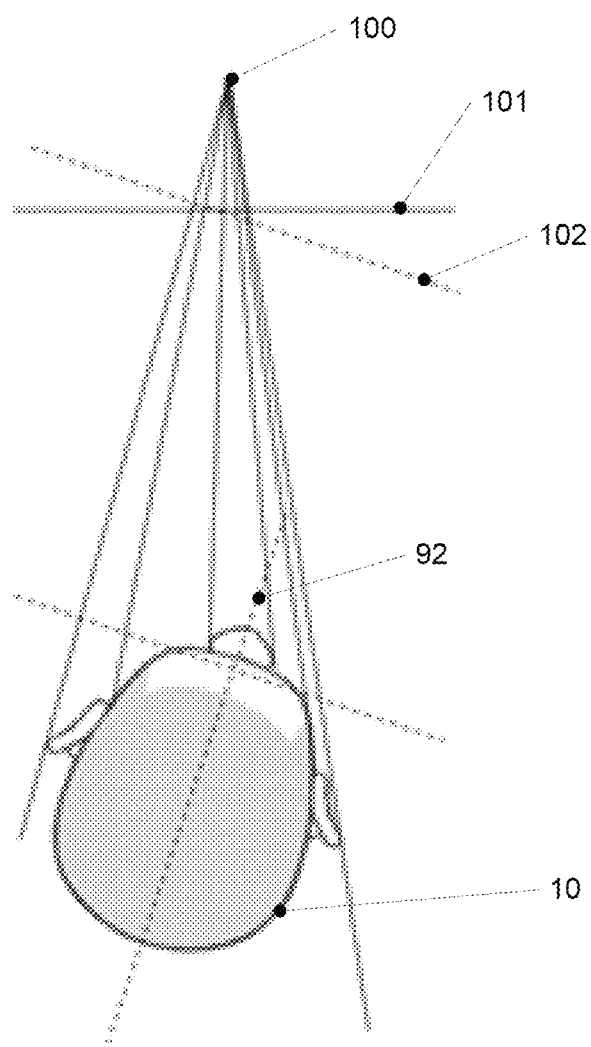

One possibility for applying a correction in advance is the rectification of the camera image (for example of the images recorded in step 81) in step 84 to convert the camera images to an image plane corresponding to an alignment of the face. This is explained with reference to FIG. 10. In FIG. 10, the head 10 is once again illustrated in the position in FIG. 9. 100 shows an optical center of a camera used (for example the camera 20 of the exemplary embodiments described above). 101 denotes an image plane of the central projection from the center 100, for example an image plane according to which the image is recorded by the camera 20. The oblique position of the head 10 results here in distortions for example between the left and right halves of the face. During the rectification, the points of the image plane 101 are converted into an image plane 102 substantially in accordance with the light rays depicted, which results in the correction, and the image thus corrected is fitted to the alignment of the face since the image plane 102 corresponds to the alignment better than the image plane 101. Parameters for spectacle fitting can then be taken from such corrected images (which if appropriate have been scaled as discussed above).

In step 85, as already indicated above, an analysis of the items of depth information and/or images which were preprocessed in steps 82 to 84 is then carried out to determine the parameters for spectacle fitting. As already explained, this can be carried out essentially using algorithms for detecting facial features or other features (for example of the spectacle frame), and corresponding parameters for spectacle fitting can then be implemented with corresponding distance or angle measurements in the data, for example in a 3D model created on the basis of the items of depth information and/or in image data scaled and/or rectified on the basis of the items of depth information. In this way, the parameters for spectacle fitting, in particular the centration parameters, can be determined in a simple manner.

As already explained, in some exemplary embodiments, it is also possible for only some of the steps elucidated in FIG. 8 to be carried out. By way of example, steps 83 and 84 can also be carried out independently of one another, and also be carried out if only one measurement of depth information is carried out, or only one measurement of depth information and one recording of an image. In other words, the multiple image recording and averaging can also be omitted.

Further, the current disclosure comprises exemplary embodiments according to the following clauses:

Clause 1. A method for determining parameters for spectacle fitting, comprising:
detecting depth information in relation to a user's head with a depth information detection unit, the depth information comprising a distance between the user's head and a device used for the detecting and comprising the depth information detection unit, and
determining parameters for spectacle fitting on the basis of the depth information, recording a 2D image of the head with a 2D camera,
wherein recording the 2D image and detecting the depth information are carried out via a common optical axis, wherein the 2D camera is different than the depth information detection unit.

Clause 2. A method for determining parameters for spectacle fitting, comprising:
detecting depth information in relation to a user's head with a depth information detection unit, determining parameters for spectacle fitting on the basis of the depth information, recording a 2D image of the head with a 2D camera,
i) wherein recording the 2D image and detecting the depth information are carried out via a common optical axis, wherein the 2D camera is different than the depth information detection unit.

Clause 3. The method according to clause 1 or 2, wherein the method further comprises determining a head position of the head, wherein determining the parameters for spectacle fitting is carried out on the basis of the determined head position.

Clause 4. The method according to any of clauses 1 to 3, wherein determining the parameters for spectacle fitting is carried out on the basis of the recorded 2D image.

Clause 5. The method according to clause 4, comprising scaling the 2D image on the basis of the depth information and/or scaling parameters for spectacle fitting, the parameters having been determined on the basis of the 2D image, on the basis of the depth information.

Clause 6. The method according to clause 4 or 5, further comprising rectifying the 2D image on the basis of the depth information.

Clause 7. The method according to any of clauses 1 to 6, wherein detecting the depth information and/or recording the 2D image are/is repeated a number of times, wherein the method further comprises averaging over a plurality of detected items of depth information and/or over a plurality of recorded images.

Clause 8. The method according to clause 7, further comprising rejecting 2D images and/or items of depth information which satisfy predetermined criteria.

Clause 9. The method according to any of clauses 1 to 8, further comprising:
i) representing a model of the head on the basis of the depth information, and
ii) virtually fitting spectacles to the model,
iii) wherein the parameters for spectacle fitting are determined on the basis of the virtual fitting.

Clause 10. A method for determining parameters for spectacle fitting, comprising:
detecting depth information in relation to a user's head, the depth information comprising a distance between the user's head and a device used for the detecting, and
determining parameters for spectacle fitting on the basis of the depth information, recording a 2D image of the head,
wherein recording the 2D image and detecting the depth information are carried out via a common optical axis, and wherein detecting the depth information and/or recording the 2D image are/is repeated a number of times, wherein the method further comprises averaging over a plurality of detected items of depth information and/or over a plurality of recorded images.

Clause 11. A method for determining parameters for spectacle fitting, comprising:
detecting depth information in relation to a user's head,
determining parameters for spectacle fitting on the basis of the depth information,
recording a 2D image of the head,
wherein recording the 2D image and detecting the depth information are carried out via a common optical axis, and wherein detecting the depth information and/or recording the 2D image are/is repeated a number of times, wherein the method further comprises averaging over a plurality of detected items of depth information and/or over a plurality of recorded images.

Clause 12. The method according to any of the preceding clauses, further comprising: combining optical axes of the depth information detection unit and the 2D camera to form the common optical axis with a beam splitter.

Clause 13. A device for determining parameters for spectacle fitting, comprising:
i) a depth information detection unit for detecting depth information with respect to a user's head, the depth information comprising at least one distance between the head and the device,
ii) an evaluation unit configured to determine the parameters for spectacle fitting on the basis of the detected depth information, and
iii) a 2D camera for recording an image of at least one part of the head,
iv) wherein the device is configured in such a way that the depth information detection unit and the 2D camera detect the head via a common optical axis.

Clause 14. A device for determining parameters for spectacle fitting, comprising:
i) a depth information detection unit for detecting depth information with respect to a user's head,
ii) an evaluation unit configured to determine the parameters for spectacle fitting on the basis of the detected depth information, and
iii) a 2D camera for recording an image of at least one part of the head,
iv) wherein the device is configured in such a way that the depth information detection unit and the 2D camera detect the head via a common optical axis.

Clause 15. The device according to clause 13 or 14, wherein the 2D camera is different from the depth information detection unit.

Clause 16. The device according to any of clauses 13 to 15, wherein the depth information detection unit comprises a light field camera.

Clause 17. The device according to any of clauses 13 to 16, wherein the depth information detection unit operates on the basis of infrared radiation.

Clause 18. The device according to any of clauses 13 to 17, wherein the depth information detection unit is configured to detect a depth profile of a region of interest of the head, and wherein the evaluation unit is configured to display a three-dimensional model of the region of interest.

Clause 19. The device according to any of clauses 13 to 18, wherein the depth information detection unit comprises a unit based on time-of-flight measurements and/or phase measurements and/or triangulation and/or pattern projection and/or stereo image recording.

Clause 20. The device according to any of clauses 13-19, wherein the device comprises a beam splitter, wherein the beam splitter is arranged to combine optical axes of the depth information detection unit and the 2D camera to form the common optical axis.

Clause 21. The device according to clause 20, wherein the beam splitter is a wavelength-selective beam splitter arranged to forward visible light to the 2D camera and infrared light to the depth information detection unit.

Clause 22. A method for determining parameters for spectacle fitting, comprising:
detecting depth information in relation to a user's head with a depth information detection unit, the depth information comprising a distance between the user's head and a device used for the detecting and comprising the depth information detection unit, and
determining parameters for spectacle fitting on the basis of the depth information, and
 i) representing a model of the head on the basis of the depth information, and
 ii) virtually fitting spectacles to the model,
wherein the parameters for spectacle fitting are determined on the basis of the virtual fitting, recording a 2D image of the head with a 2D camera,
wherein recording the 2D image and detecting the depth information are carried out via a common optical axis, wherein the 2D camera is different than the depth information detection unit.

Clause 23. A method for determining parameters for spectacle fitting, comprising:
detecting depth information in relation to a user's head by means of a depth information detection unit,
determining parameters for spectacle fitting on the basis of the depth information, and
 i) representing a model of the head on the basis of the depth information, and
 ii) virtually fitting spectacles to the model,
wherein the parameters for spectacle fitting are determined on the basis of the virtual fitting, recording a 2D image of the head by means of a 2D camera,
wherein recording the 2D image and detecting the depth information are carried out via a common optical axis, wherein the 2D camera is different than the depth information detection unit.

Clause 24. The method according to clause 22 or 23, wherein the method further comprises determining a head position of the head, wherein determining the parameters for spectacle fitting is carried out on the basis of the determined head position.

Clause 25. The method according to any of clauses 22 to 24, further comprising recording an image of the head, wherein determining the parameters for spectacle fitting is carried out on the basis of the recorded image.

Clause 26. The method according to clause 25, comprising scaling the image on the basis of the depth information and/or scaling parameters for spectacle fitting, the parameters having been determined on the basis of the image, on the basis of the depth information.

Clause 27. The method according to clause 25 or 26, further comprising rectifying the image on the basis of the depth information.

Clause 28. The method according to any of clauses 22 to 27, wherein detecting the depth information and/or recording the image are/is repeated a number of times, wherein the method further comprises averaging over a plurality of detected items of depth information and/or over a plurality of recorded images.

Clause 29. The method according to clause 28, further comprising rejecting images and/or items of depth information which satisfy predetermined criteria.

Clause 30. A method for determining parameters for spectacle fitting, comprising:
detecting depth information in relation to a user's head, the depth information comprising a distance between the user's head and a device used for the detecting, and
determining parameters for spectacle fitting on the basis of the depth information,
  i) representing a model of the head on the basis of the depth information, and
  ii) virtually fitting spectacles to the model, wherein the parameters for spectacle fitting are determined on the basis of the virtual fitting,
recording a 2D image of the head,
wherein recording the 2D image and detecting the depth information are carried out via a common optical axis, and wherein detecting the depth information and/or recording an image are/is repeated a number of times, wherein the method further comprises averaging over a plurality of detected items of depth information and/or over a plurality of recorded images.

Clause 31. A method for determining parameters for spectacle fitting, comprising:
detecting depth information in relation to a user's head,
determining parameters for spectacle fitting on the basis of the depth information,
  i) representing a model of the head on the basis of the depth information, and
  ii) virtually fitting spectacles to the model, wherein the parameters for spectacle fitting are determined on the basis of the virtual fitting, recording a 2D image of the head,
wherein recording the 2D image and detecting the depth information are carried out via a common optical axis, and wherein detecting the depth information and/or recording an image are/is repeated a number of times, wherein the method further comprises averaging over a plurality of detected items of depth information and/or over a plurality of recorded images.

Clause 32. The method according to any of clauses 22 to 31, furthermore comprising: combining optical axes of the depth information detection unit and the 2D camera to form the common optical axis by means of a beam splitter.

Clause 33. The method according to clause 32 or 12, wherein the beam splitter is a wavelength-selective beam splitter arranged to forward visible light to the 2D camera and infrared light to the depth information detection unit.

Clause 34. A method for determining parameters for spectacle fitting, comprising:
detecting depth information in relation to a user's head by means of a depth information detection unit, and
determining parameters for spectacle fitting on the basis of the depth information,
characterized in that the depth information detection unit is selected from the group consisting of a light field camera, a time-of-flight sensor and a camera-based infrared depth sensor, in which an infrared pattern is generated by a projection system and, by means of the scene thus illuminated being recorded by an infrared camera, the depth of the objects in the scene is averaged, or in that the depth information detection unit operates on the basis of infrared radiation or on the basis of patterns in the visible light range, or in that the depth information detection unit uses a distance measurement by means of optical triangulation.

Clause 35. A device for determining parameters for spectacle fitting, comprising:
a depth information detection unit for detecting depth information with respect to a user's head, and
an evaluation unit configured to determine the parameters for spectacle fitting on the basis of the detected depth information,
characterized in that the depth information detection unit is selected from the group consisting of a light field camera, a time-of-flight sensor and a camera-based infrared depth sensor, in which an infrared pattern is generated by a projection system and, by means of the scene thus illuminated being recorded by an infrared camera, the depth of the objects in the scene is averaged, or in that the depth information detection unit operates on the basis of infrared radiation or on the basis of patterns in the visible light range, or in that the depth information detection unit uses a distance measurement by optical triangulation.

The foregoing description of the exemplary embodiments of the disclosure illustrates and describes the present invention. Additionally, the disclosure shows and describes only the exemplary embodiments but, as mentioned above, it is to be understood that the disclosure is capable of use in various other combinations, modifications, and environments and is capable of changes or modifications within the scope of the concept as expressed herein, commensurate with the above teachings and/or the skill or knowledge of the relevant art.

The term "comprising" (and its grammatical variations) as used herein is used in the inclusive sense of "having" or "including" and not in the exclusive sense of "consisting only of." The terms "a" and "the" as used herein are understood to encompass the plural as well as the singular.

All publications, patents and patent applications cited in this specification are herein incorporated by reference, and for any and all purposes, as if each individual publication, patent or patent application were specifically and individually indicated to be incorporated by reference. In the case of inconsistencies, the present disclosure will prevail.

LIST OF REFERENCE SIGNS

10 Head
11 Spectacles
12 Depth information detection unit
13 Evaluation unit
20 Camera
30 Beam splitter
40 Component
41 Component
50 Depth profile
51 Spectacles
52 Eye
10 Head profile
60A, 60B Pupillary distance
61 Central line
62A, 62B Fitting height
63 Corneal vertex distance
64 Forward inclination
65 Frame disk angle
66 Bridge width
67 Disk width
68 Disk height
70-72; 80-85 Method steps
90 Angle
91 Central axis 92 Central axis
100 Optical camera center
101 Image plane
102 Rectified image plane

The invention claimed is:

1. A method for determining parameters for spectacle fitting, the method comprising:
   detecting depth information in relation to a user's head with a depth information detection unit,
   determining parameters for spectacle fitting based on the depth information,
   recording a 2D image of the user's head with a 2D camera,
   wherein the 2D camera and the depth information detection unit each have a respective optical axis, wherein the optical axis of the 2D image camera and the optical axis of the depth information detection unit are combined, and wherein the 2D camera is different from the depth information detection unit, and
   rectifying the 2D image based on the depth information by performing at least one of aligning or correcting the 2D image to remove distortions in the 2D image.

2. The method as claimed in claim 1, further comprising:
   determining a head position of the user's head, wherein determining the parameters for spectacle fitting is carried out on based on the determined head position.

3. The method as claimed in claim 1, further comprising:
   representing a model of the user's head that has been obtained based on the depth information, and
   virtually fitting spectacles to the model,
   wherein the parameters for spectacle fitting are determined based on the virtual fitting.

4. The method as claimed in claim 1, further comprising:
   determining the parameters for spectacle fitting based on the recorded 2D image.

5. The method as claimed in claim 4, further comprising:
   scaling at least one of the 2D image or the parameters for spectacle fitting based on the depth information, wherein the parameters for spectacle fitting have been determined based on the 2D image.

6. The method as claimed in claim 1, wherein at least one of detecting the depth information or recording the 2D image is repeated a number of times, and wherein the method further comprises:
   averaging over at least one of a plurality of detected items of depth information or a plurality of recorded images.

7. The method as claimed in claim 6, further comprising rejecting at least one of a subset of 2D images from the plurality of recorded images or a subset of detected items of depth information from the plurality of detected items, which satisfy predetermined criteria.

8. The method as claimed in claim 1, further comprising:
   combining the respective optical axes of the depth information detection unit and the 2D camera to form a common beam path segment with a beam splitter.

9. The method as claimed in claim 8, wherein the beam splitter is a wavelength-selective beam splitter arranged to forward visible light to the 2D camera and infrared light to the depth information detection unit.

10. A method for determining parameters for spectacle fitting, the method comprising:
    detecting depth information in relation to a user's head with a depth information detection unit,
    determining parameters for spectacle fitting based on the depth information,
    recording a 2D image of the user's head with a 2D camera,
    wherein the 2D camera and the depth information detection unit each have a respective optical axis, wherein the optical axis of the 2D image camera and the optical axis of the depth information detection unit are combined, and wherein the 2D camera is different from the depth information detection unit,
    wherein at least one of detecting the depth information or recording the 2D image is repeated a number of times to record a plurality of recorded images or a plurality of detected items, and
    rejecting at least one of a subset of 2D images from a plurality of recorded images or a subset of detected items of depth information from the plurality of detected items, which satisfy predetermined criteria.

11. The method as claimed in claim 10, further comprising:
    determining a head position of the user's head, wherein determining the parameters for spectacle fitting is carried out on based on the determined head position.

12. The method as claimed in claim 10, further comprising:
    determining the parameters for spectacle fitting based on the recorded 2D image.

13. The method as claimed in claim 10, further comprising:
    scaling at least one of the 2D image or the parameters for spectacle fitting based on the depth information, wherein the parameters for spectacle fitting have been determined based on the 2D image.

14. The method as claimed in claim 10, wherein at least one of detecting the depth information or recording the 2D image is repeated a number of times, and wherein the method further comprises:
    averaging over at least one of a plurality of detected items of depth information or a plurality of recorded images.

15. The method as claimed in claim 10, further comprising:
    representing a model of the user's head that has been obtained based on the depth information, and
    virtually fitting spectacles to the model,
    wherein the parameters for spectacle fitting are determined based on the virtual fitting.

16. The method as claimed in claim 10, further comprising:
    combining the respective optical axes of the depth information detection unit and the 2D camera to form a common beam path segment with a beam splitter.

17. The method as claimed in claim 16, wherein the beam splitter is a wavelength-selective beam splitter arranged to forward visible light to the 2D camera and infrared light to the depth information detection unit.

* * * * *

UNITED STATES PATENT AND TRADEMARK OFFICE
CERTIFICATE OF CORRECTION

| | |
|---|---|
| PATENT NO. | : 11,126,016 B2 |
| APPLICATION NO. | : 16/151068 |
| DATED | : September 21, 2021 |
| INVENTOR(S) | : Tobias Breuninger et al. |

Page 1 of 1

It is certified that error appears in the above-identified patent and that said Letters Patent is hereby corrected as shown below:

In the Claims

Column 25, Line 27, Claim 2, change "out on based" to -- out based --.

Column 26, Line 26, Claim 11, change "out on based" to -- out based --.

Signed and Sealed this
Seventh Day of December, 2021

Drew Hirshfeld
*Performing the Functions and Duties of the*
*Under Secretary of Commerce for Intellectual Property and*
*Director of the United States Patent and Trademark Office*